Nov. 10, 1942.    R. ANDERSON    2,301,500
WIRE GUIDING DEVICE
Filed May 31, 1940    4 Sheets-Sheet 1
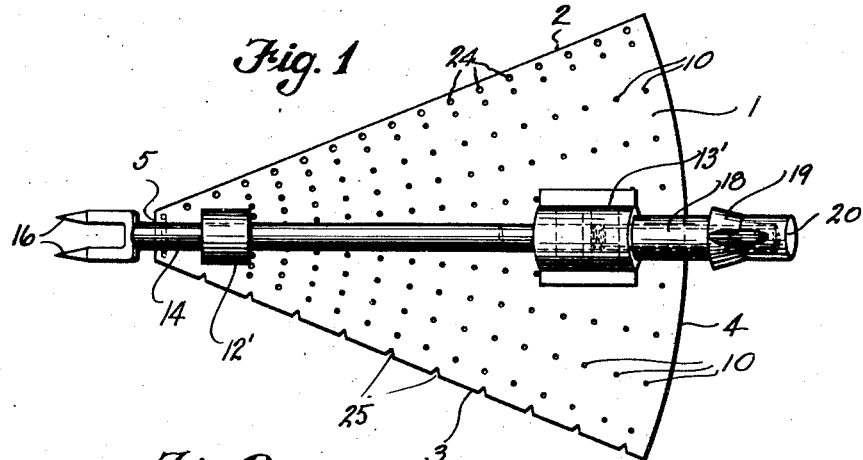
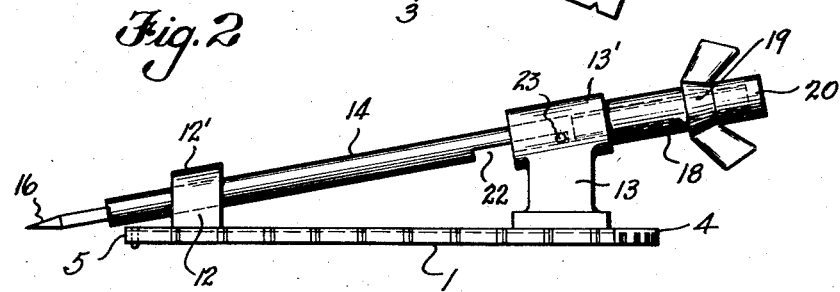
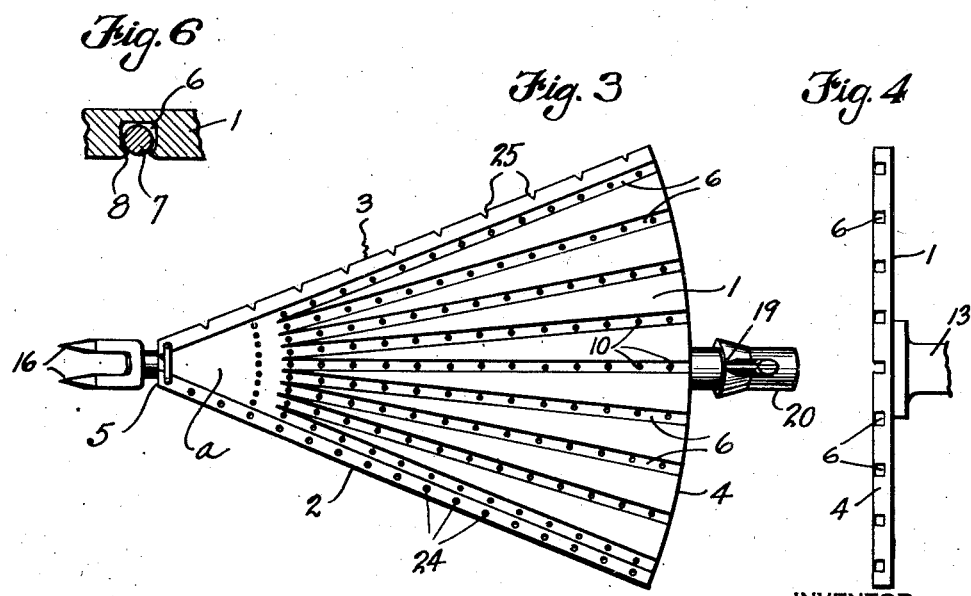
INVENTOR
ROGER ANDERSON
BY
Cook & Robinson
ATTORNEY

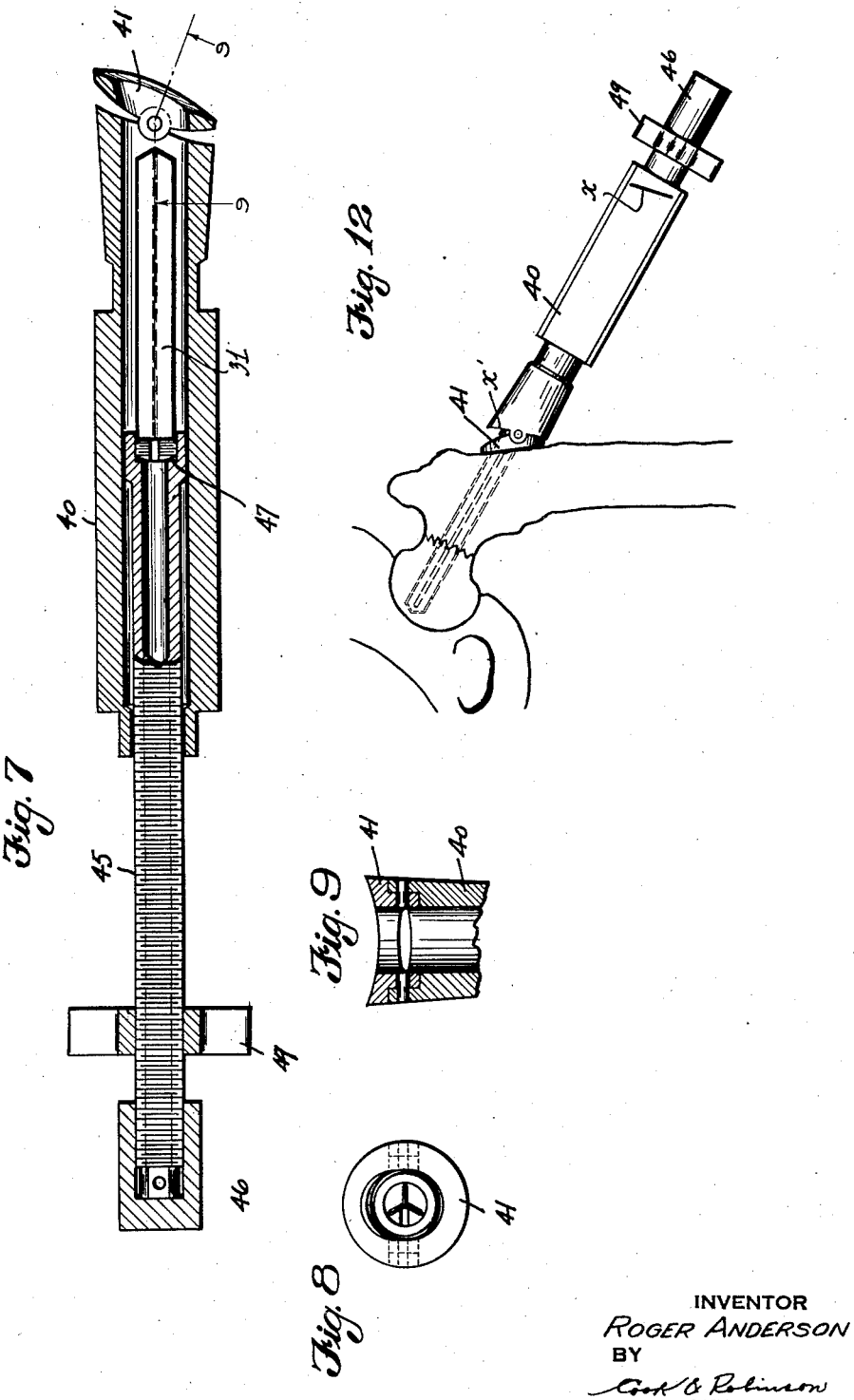

Nov. 10, 1942.  R. ANDERSON  2,301,500
WIRE GUIDING DEVICE
Filed May 31, 1940  4 Sheets-Sheet 3
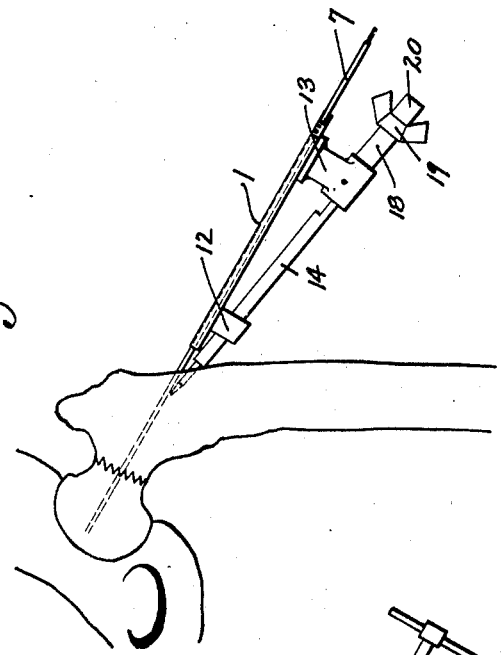
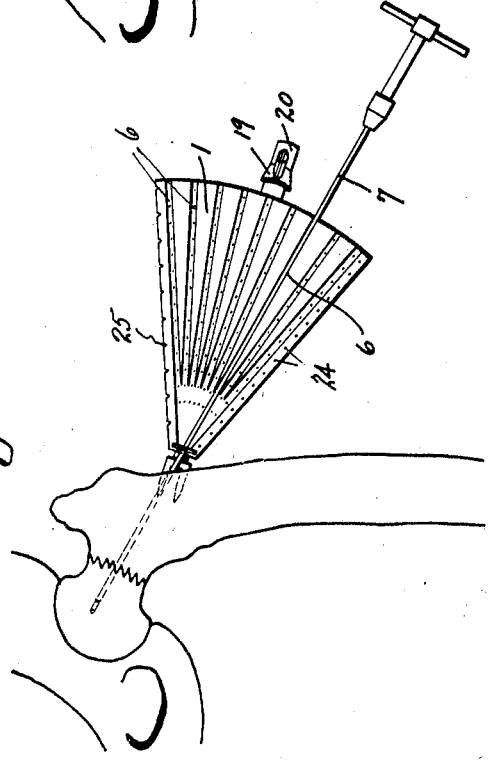
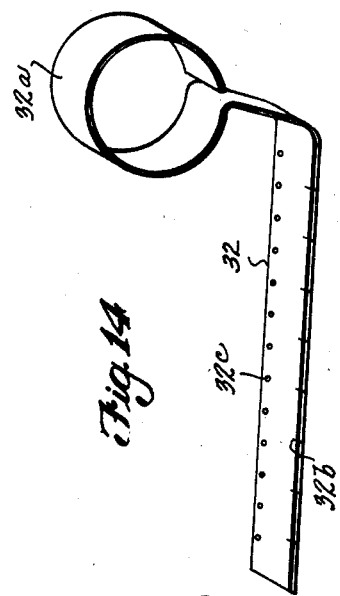
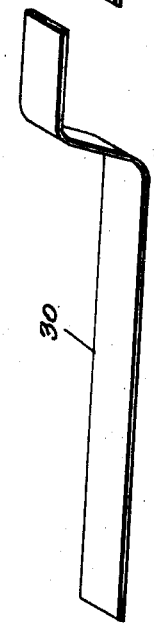
INVENTOR
ROGER ANDERSON
BY
Cook & Robinson
ATTORNEY Nov. 10, 1942.   R. ANDERSON   2,301,500
WIRE GUIDING DEVICE
Filed May 31, 1940   4 Sheets-Sheet 4
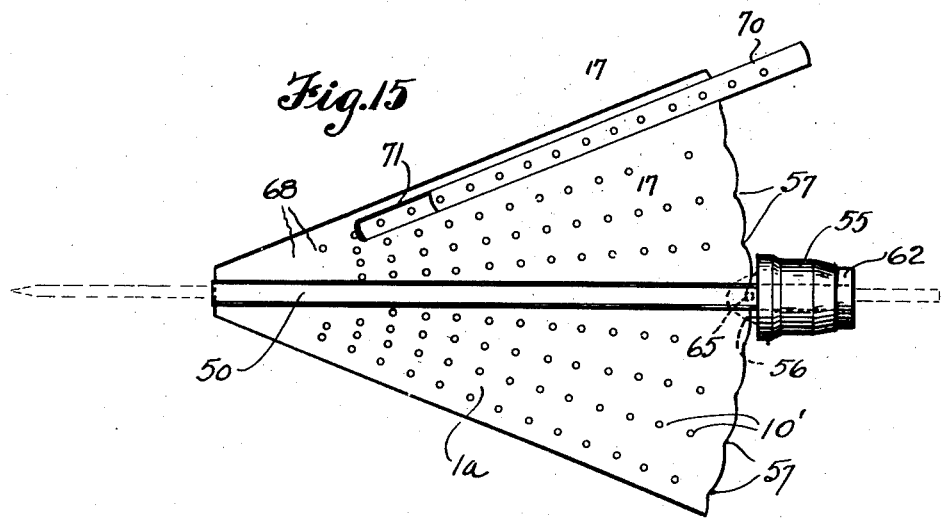
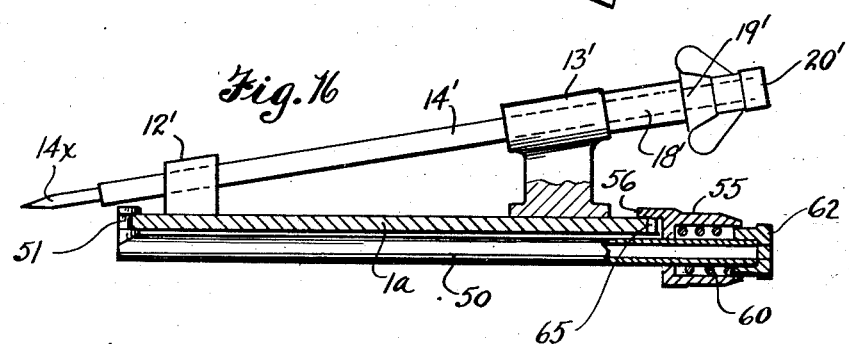
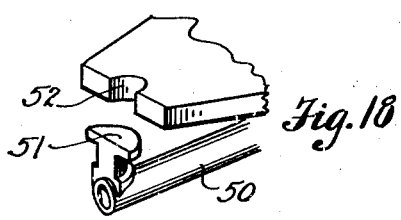
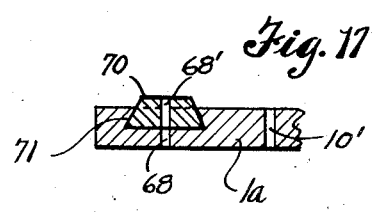
INVENTOR
ROGER ANDERSON
BY
Cook & Robinson
ATTORNEY Patented Nov. 10, 1942

2,301,500

UNITED STATES PATENT OFFICE 2,301,500

WIRE GUIDING DEVICE

Roger Anderson, Seattle, Wash.

Application May 31, 1940, Serial No. 338,158

5 Claims. (Cl. 128—83)

This invention relates to direction determining and pin guiding means as employed in the applying of internal fixations in fractures of the neck of the femur; it being the principal object of this invention to provide a device, to be used in conjunction with X-ray and fluoroscopic examinations to determine the proper direction for the insertion of a guide wire or pin and for determining the proper length for the fixation nail that is to be used and guided into place by the pin.

More specifically stated, the objects of the present invention reside in the provision of a device of a simplified form, whereby, through the use of X-ray photographs, or fluoroscopic examinations the direction of insertion of a guide pin, with reference to horizontal and vertical planes of examination, may be determined and the pin guided into place, and whereby the required length of the fixation nail to be applied may be determined.

Other objects of the invention reside in the improved features and in the simplification of the device, as compared with devices previously used, both with respect to structure and to method of use; furthermore, in the provision of a device of this character that can be easily kept in a sanitary condition by reason of the accessibility to all channels or parts for thorough cleaning and sterilization.

Still further objects of the invention reside in the details of construction and combination of parts, and in their mode of use, as will hereinafter be fully described.

In accomplishing these and other objects of the invention, I have provided the improved details of construction, the preferred forms of which are illustrated in the accompanying drawings, wherein—

Fig. 1 is a plan, or top view of the direction finding and pin guiding device embodied by this invention.

Fig. 2 is a side view of the same.

Fig. 3 is a bottom view of the device showing the pin guide slots provided therein.

Fig. 4 is an edge view of the outer end of the pin guide plate showing the slots.

Fig. 5 is a view of one of the guide pins adapted to be used with the device.

Fig. 6 is an enlarged, cross sectional view of one of the pin-guide channels of the plate with guide pin located therein.

Fig. 7 is a longitudinal, sectional view of the tool used in the driving of a nail while the latter is guided by a pin applied in accordance with this invention.

Fig. 8 is an end view of the nail driving tool.

Fig. 9 is a cross sectional detail taken on line 9—9 in Fig. 7.

Figs. 10 and 11 are views illustrating use of the pin guiding device.

Fig. 12 is a view illustrating the use of the nail driving tool.

Fig. 13 and Fig. 14 are perspective views of the devices that are used in determining the guide pin positions and for measuring the fixation nail.

Fig. 15 is a face view of the present preferred form of device.

Fig. 16 is a longitudinal sectional view of the same.

Fig. 17 is an enlarged sectional detail as taken on line 17—17 in Fig. 15.

Fig. 18 is a detail in perspective showing the means for mounting the pin guide tube.

Before describing the structure of the present device, and its mode of use, it will be mentioned that without employing radiography; that is X-ray or fluoroscope apparatus and instruments of the present type, it is very difficult to ascertain the required direction of application and length or extent of insertion of internal fixations for fractures occurring in the neck of the femur.

Furthermore, it is very essential to the welfare of the patient that the fixation nail, or nails, be applied in a proper direction and to an exact extent, in order to be effective and not cause pain or result in a stiff joint.

The present instrument, in its various modifications, is designed for use in conjunction with lateral and anterior-posterior X-ray or fluoroscope examinations of the fracture which I will refer to as radiographs, as a means of determining not only the angle or direction of insertion of the fixation guide pin, but also for arriving at the exact, proper length of nail or fixation required for any particular position.

Referring more in detail to the drawings—

First, describing the modifications of the direction finding instrument, which has been illustrated in detail in Figs. 1 to 4, inclusive, 1 designates a flat plate, of a metal or material that is substantially opaque to X-rays, and preferably having a shape that is approximately that of an isosceles triangle in that its two side edges, designated at 2 and 3, are of equal length. These edges diverge relative to each other at an angle of approximately 45° and the base edge 4 of the plate, which would correspond to the base of the triangle and which will be referred to as the outer edge, is curved radially about the center point at which the side edges would converge. At the inner end, the plate is formed with a short, blunt end surface 5.

Formed in one face of the plate, are radially directed, spaced channels 6, all of which converge toward a common center point located at the medial point between opposite ends of the blunt end surface 5. Each of these channels, as here shown, is somewhat rectangular in cross section and opens to the base end of the plate, as observed in Fig. 4, and is designed to receive therein a guide pin 7 of that kind illustrated in Fig. 5, or of similar kind, for endwise movement therein. Also, each channel has its open side restricted to some extent, as noted in Fig. 6, by provision of overhanging shoulders 8 to retain a pin therein. All channels open at their inner ends to an end area of the plate designated at $a$ in Fig. 3, which is open at the blunt end of the plate.

The cross sectional shape of the channels 6 may vary, but in each case should be such as to retain the pins therein as is accomplished by the shoulders 8.

It will also be observed by reference to Figs. 1 and 3, that rows of small perforations 10, equally and definitely spaced, are provided longitudinally of the several channels, and these perforations open through the plate and are utilized, as later will be understood, in the determining of the selection of any particular channel for the insertion of a guide pin.

Fixedly mounted upon the plate, preferably in a plane perpendicular thereto and bisecting the angle between the side edges, are brackets 12 and 13 forming guide bearings 12' and 13' in which a rod or shaft 14 is slidably contained for endwise movement. This rod is disposed at such an angle relative to the plane of the surface of the plate that its extended axial line would approximately intersect the center of convergence of the extended lines of the opposite side edges. At this end, the rod is formed with a sharpened prong, or, as here illustrated, with a pair of spaced, sharpened prongs 16, and at the other end, which extends beyond the base edge 4, it is threaded and has a sleeve or collar 18 applied over this threaded portion and seated against the bearing 13', and a wing nut 19 is threaded onto the rod end to engage the outer end of the sleeve, and beyond the nut, a cap 20 is threaded onto the rod end to serve as a protection to the threads and to receive light hammer blows in driving the sharpened prongs 16 into a bone. The rod is provided along one side with a recess 22, of limited length through which a pin 23, mounted in bearing 13', extends, to limit the longitudinal travel of the rod and also to hold it against rotation relative to the plate.

Along one side edge, the plate is formed with a row of perforations 24, spaced definite intervals; for example, one-fourth inch apart, and along the opposite edge are notches 25, spaced one centimeter apart. These holes and notches are selectively utilized in determining the proper length of fixations, as presently will be described.

In use of the device for the applying of an internal fixation in a fracture of the neck of the femur, assuming that the fracture has been reduced, the leg is held in proper abduction and rotation, the skin over the affected thigh is prepared and an incision made from the great trochanter paralleling the shaft of the femur, down through the periosteum to the bone. Then the blunt end of the plate 1 is inserted in the incision below the trochanter into the groove formed by the great trochanter and shaft. The operator then directs the plate toward what he believes to be the proper position and the prongs 16 are pressed or driven into the bone so that the plate will be held in place, for instance, in the manner like it has been shown in Fig. 10, wherein the plate is illustrated as being in what may be called a "horizontal plane."

With the plate 1 thus fixed in place, an anterior-posterior X-ray photograph is taken, by placing the casette under the hip and directing the X-rays directly down in a line passing through the point of contact of the plate end with the bone. Then, by reference to the photograph taken, the proper channel 6 in the plate may be selected in which a pin 7 may be located for guided projection into the fractured parts.

The determination of the proper channel may most easily be done by laying a flat, straight-edged strip, like that designated at 30 in Fig. 13, directly upon the X-ray picture or plate and, when its straight edge has been located in registration with the desired line of the wire, note is made of the nearest channel 6 in the image of the plate; these channels being clearly identified by the images of the rows of perforations 10.

After thus determining, on the photograph, the desired or proper channel, a pin 7 is inserted in the corresponding plate channel and pushed, drilled or hammered into the bone, as noted in Fig. 10, which shows the pin as being equipped at its outer end with a hand tool to facilitate its insertion.

After this first pin is inserted, the prongs 16 are withdrawn, by tightening the wing nut 19 on the rod, and the plate rotated on the pin through a 90° interval, to assume the position as noted in Fig. 11, which may be referred to as the "vertical plane" position, and the prongs 16 again pressed into the bone to hold the plate in place. Then a lateral X-ray is taken of the fracture, and by reference to the X-ray plate or picture, and by use of the straight edge plate, the proper channel for insertion of the pin is again determined. In case the pin that already is in place is in the proper channel, it is left there, but if not, it is withdrawn and a pin is inserted in the proper channel after the fashion illustrated in Fig. 11. This pin then is ready for use as the means for guiding a fixation nail into place in the fracture.

After the location for the pin has thus been determined, and the pin inserted, the prongs 16 are withdrawn and the plate is removed by slipping endwise along and from the outer end of the pin. Then the selected fixation 31, or nail, of the type illustrated in Fig. 7, is slipped onto the wire and driven into place, sliding along the pin, which acts as a guide whereby to direct it to the proper place. However, prior to insertion of the nail, the anterior-posterior fracture plate is referred to, to determine the proper length of nail. This is done as follows:

With the understanding that all parts of the fracture as seen in the picture would be distorted to the same extent as the picture or image of the plate 1, a measurement is taken directly on the picture or image of the distance from the inner surface of the femur head to the point of contact of plate 1 with the bone. This might conveniently be marked off on the edge of the straight edge plate 30. Then this distance is compared with the image of the scale of notches 25 or holes 24 provided at the longitudinal edges of the plate 1. If, for example, the measured distance extends over a span of ten units, as set off by the spaced perforations 24, then the operator knows a nail 2½ inches long is required. Likewise the length of nail in centimeters may be determined by reference to the scale of notches 25. The scale 32, shown in Fig. 14, is a true scale and is retained sterile for making direct measurements of the nails to be used after the required length has been determined.

The scale 32 is formed with a holding loop 32a at one end, and the scale body is formed with line graduations 32b along one edge, and perforations 32c at equal intervals along its other edge for taking measurements.

The type of nail used preferably is that known as the "Smith Peterson" and comprises a pointed shaft with three longitudinal and radial fins and a central longitudinal hole or channel which permits the nail to be slipped onto the guide pin.

Preferably, a driver as shown in Fig. 7 is used to drive the nail into place. This comprises a barrel or impactor 40 with a pivoted shoe 41 at one end designed to seat against the bone, as in Fig. 12. Slidable in the barrel is a driver 45 with a driving cap 46 at its outer end, and a socket 47 at its inner end. The nail is first threaded into the socket 47 of the driver 45 and is driven, while guided by the applied pin, into the bone until the end surface of the driver contacts the bone. Then the impactor is slipped over the driver, and with the shoe 41 seated against the bone, a nut 49 is threaded onto the driver and against the end of the impactor. Then blows are applied to the outer end of the driver, through the impactor, to drive the bone fragments together and properly seat the nail.

It will here be mentioned that the impactor carries on its outside a line or mark, as at X in Fig. 12, in a plane parallel with the sloping face X' of the impactor end so that the operator may maintain the proper relationship of the shoe 41 and engaged surface of the bone when the shoe is applied thereto.

In case it should be desirable to withdraw the nail this may be done by the tightening of the extractor nut 49 that is threaded onto driver 45, against the outer end of impactor 40. The outer end of the nail is threaded into the socket 47 of the driver, and will thus be drawn out with the travel of the driver.

The device is thus rendered easy to use, simple in construction, and, due to all channels being open, it may easily be kept clean and sterile.

The present preferred form of device is that illustrated in Figs. 15, 16, 17 and 18. In this form of construction, I utilize a flat plate 1a, corresponding to and having a shape similar to that of the plate 1 of the device already described, and likewise formed with a plurality of equally angularly spaced rows of perforations 10' corresponding to the rows of perforations 10 in the former device, but omitting the guide channels. Mounted on one side of the plate 1a, in the same manner as the shaft 14 was described in connection with plate 1, is a fixing shaft 14', longitudinally movable in its mounting bearings 12' and 13' that are fixed to the plate. This shaft 14' is equipped at its inner end with a bone piercing prong or extension 14x of rectangular cross section. At its outer end, the shaft 14' is equipped with a sleeve 18', wing nut 19' and cap 20', for the same purposes and in the same manner as these corresponding parts of the previously described device.

Located at that side of the plate 1a that is opposite the side that mounts the shaft 14', is a tubular pin guide 50. This is disposed parallel with the face of the plate and is adjustable to different positions corresponding to the location of the rows of perforations in the plate 1. At one end, this tube is formed with a supporting lug 51 that seats pivotally in a semi-circular socket or notch 52 in the point end of the plate 12. Adjustable on the other, or outer end portion of the tube is a supporting bearing 55 having a lip 56 adapted to supportingly overlap the outer edge of the plate 1a. The outer edge of the plate 1a is formed in a series of scallops, at the junction of which seats 57 are formed, and these seats are respectively alined with the rows of perforations in the plate. A coiled spring 60 is disposed about the tube between the bearing 55 and a nut 62 fixed on the outer end of the tube, and this urges the bearing into holding contact with the plate edge. A pin 65 that is fixed in the adjustable bearing is adapted to be selectively engaged in any of the seats defined by scallops, thus to hold the guide tube yieldingly against movement after being once located at any of the different positions of adjustment.

The manner of use and purpose of this device is the same as the use and purpose of the device previously described except that instead of selecting a proper slot for guiding of the pin to place, the guide tube is located, after X-ray inspection, in registration with the proper row of perforations. Then the pin 7 is inserted in the tube, and will be guided thereby as pushed into the bone.

The plate 1a, like the plate 1, is provided with the marginal row of perforations 68 to be used in the measurement of transfixion members, and in order to extend the effective length of the row of perforations, an extension slide member 70 is fitted in a dovetailed groove 71 in the top face of the plate 1a. When not in use, this extension is moved to its inner position and when desired for use, it may be adjusted to an extended position, and since it is equipped with perforations 68' registering with those of the plate, it serves as an extension, measuring element.

Having thus described my invention, what I claim as new therein and desire to secure by Letters Patent is:

1. A device of the character described, comprising a plate formed with areas which, in radiographic images of the plate, define direction lines converging toward a common center at the inner end of the plate, a bone piercing shaft mounted on the plate and adapted to be pressed into a bone for temporarily fixing the plate thereto with its inner end disposed against the bone, and a pin guide tube adjustable on the plate whereby a pin may be guided endwise along any one of the direction lines into the bone; said guide tube serving as a support for rotation of the plate about an applied pin to different angular positions.

2. A device of the character described comprising a flat plate formed with areas which are discernible in radiograph images of the plate and which define direction lines in angular convergence toward a center point at the inner end of the plate, means on the plate whereby it may be temporarily fixed with its inner end engaged with the bone, a guide tube pivotally mounted on the plate for adjustment about said center point into coincidence with any of said lines and through which tube a pin may be guided into the bone, and means whereby the tube may be temporarily held at a selected position of adjustment; said tube serving as a supporting hub whereby the plate may be held for rotation about an applied pin as an axis upon disengagement of the fixing means from the bone.

3. A device as recited in claim 2 wherein the plate is formed with spaced notches along its outer edge, and latch means is mounted on the outer end of the tube to be selectively engaged in any of said notches for holding the tube in coincidence with any selected direction line.

4. A device as recited in claim 2 wherein the inner end of the plate is formed with a pivot seat and said outer end is formed with notches corresponding to the direction lines, and said tube is formed at its inner end with a bearing support adapted to pivotally engage in the end seat and a spring pressed latch device is mounted on the outer end of the tube to engage the notches plate edge to support the tube and to register it with any of said direction lines.

5. A device of the character described, comprising a flat plate with side edges converging to a blunt point at the inner end of the plate for engaging against the bone; said plate having a plurality of spaced pin guide channels formed in one face thereof converging toward a point that is adjacent the inner end of the plate, and discernable in an X-ray image of the plate, guide bearings fixed on the plate, a shaft longitudinally movable in the bearings and having a prong at one end adapted to be pressed into the bone against which the inner end of the plate may be disposed to temporarily fix the plate relative to the bone, and a pin adapted to be located in any selected channel of the plate and to be guided thereby endwise while the inner end portion is advanced into the bone, and to serve as an axis of rotation for the plate when the latter is released from the bone by the withdrawal of said prongs.

ROGER ANDERSON.